US009396363B2

(12) United States Patent
McConnell

(10) Patent No.: US 9,396,363 B2
(45) Date of Patent: Jul. 19, 2016

(54) GESTURE AND MOTION OPERATION CONTROL FOR MULTI-MODE READING DEVICES

(71) Applicant: John M. McConnell, Eugene, OR (US)

(72) Inventor: John M. McConnell, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 125 days.

(21) Appl. No.: 13/737,824

(22) Filed: Jan. 9, 2013

(65) Prior Publication Data

US 2013/0181050 A1     Jul. 18, 2013

Related U.S. Application Data

(60) Provisional application No. 61/586,599, filed on Jan. 13, 2012.

(51) Int. Cl.
   *G06K 7/00* (2006.01)
   *G06K 7/10* (2006.01)

(52) U.S. Cl.
   CPC ............ *G06K 7/0004* (2013.01); *G06K 7/1091* (2013.01); *G06K 7/10386* (2013.01)

(58) Field of Classification Search
   USPC ......................................................... 235/440
   See application file for complete search history.

(56) References Cited

U.S. PATENT DOCUMENTS

| 5,640,002 | A | 6/1997 | Ruppert et al. |
| 7,721,968 | B2 * | 5/2010 | Wigdor ............... G01C 9/00 235/472.01 |
| 7,844,915 | B2 | 11/2010 | Platzer et al. |
| 2005/0178832 | A1 | 8/2005 | Higuchi |
| 2008/0054062 | A1 | 3/2008 | Gunning et al. |
| 2008/0267537 | A1 * | 10/2008 | Thuries ............ G06K 7/10851 382/321 |
| 2011/0270751 | A1 | 11/2011 | Csinger et al. |
| 2012/0224040 | A1 * | 9/2012 | Wang .................. G06K 7/1091 348/77 |
| 2013/0053007 | A1 * | 2/2013 | Cosman ................ G06F 3/017 455/414.3 |
| 2013/0105565 | A1 * | 5/2013 | Kamprath .......... G06F 19/3475 235/375 |

FOREIGN PATENT DOCUMENTS

| JP | 2005-267627 A | 9/2005 |
| JP | 2005-284639 A | 10/2005 |
| KR | 2006-0103378 A | 9/2006 |
| KR | 2007-0074016 A | 7/2007 |
| KR | 2012-0001164 A | 1/2012 |

OTHER PUBLICATIONS

International Search Report & Written Opinion, International Application No. PCT/US2013/021004, dated Apr. 25, 2013, pp. 11.

* cited by examiner

*Primary Examiner* — Michael G Lee
*Assistant Examiner* — David Tardif
(74) *Attorney, Agent, or Firm* — Stoel Rives LLP

(57) ABSTRACT

A portable data reader and methods of operation for reading encoded data, such as optical code labels and RFID tags, from an object. The data reader includes a housing adapted for handheld operation and a touch screen display supported on the housing. The data reader further includes one or more reading engines each associated with a set of decoding instructions for configuring the reading engines to read data from the object. The reading engines are each associated with a unique control gesture that may be applied to the touch screen display to configure the data reader with a particular reading engine. The portable data reader includes a processing subsystem communicatively coupled to the touch screen and the reading engines and operable to detect whether a control gesture has been applied to the touch screen display or rocker keys and then to configure the data reader with the selected reading engine.

20 Claims, 3 Drawing Sheets

GESTURE AND MOTION OPERATION CONTROL FOR MULTI-MODE READING DEVICES

RELATED APPLICATION DATA

This application is a nonprovisional of and claims the benefit under 35 U.S.C. §119(e) of U.S. Provisional Patent Application No. 61/586,599, filed Jan. 13, 2012, which is incorporated by reference herein in its entirety.

BACKGROUND

The field of the disclosure generally relates to systems for reading and decoding various optical code symbologies and RFID tag formats. More particularly, the field of the disclosure relates to data readers having a touch screen interface for configuring and triggering a particular set of optical code and RFID decoding parameters to apply during a reading or scanning event.

Optical reading systems are widely used to read data in the form of optical codes or other encoded symbols printed on various objects. These systems may be used in a wide variety of applications, such as inventory control and point-of-sale transactions in retail stores. Barcodes are just one example of the many types of optical codes in use today. The most common barcodes are one-dimensional or linear optical codes, where the information is encoded in one direction—the direction perpendicular to the bars and spaces. For example, one-dimensional (1D) barcode symbologies may include Code 128, Code 29, Interleaved 2 of 5, matrix 2 of 5, Universal Product Code (UPC), Extended Code 39, Code 93, UCC 128, Codabar, EAN/JAN, MSI, Zip+4, Pharmacode 39, RSS, Standard 2 of 5, Trioptic, DPBC POSTNET. Higher-dimensional optical codes, such as, two-dimensional matrix codes (e.g., MaxiCode) or stacked codes (e.g., PDF 417), which are also sometimes referred to as "barcodes," are also used for various purposes. Based on the type of barcode label that is being used, an appropriate set of decoding parameters is used to accurately read and process the data.

Typically, a barcode label comprises a series of parallel dark bars of varying widths with intervening light spaces, also of varying widths. The information encoded in the barcode label is represented by the specific sequence of bar and space widths. Optical reading systems may employ an optical reader that illuminates the barcode label and detects light reflected from the bars and spaces of the code. One common optical reader is a flying spot scanner in which a source of illumination, such as a laser or LED, is moved across the barcode while a photodetector in the optical reader monitors the reflected or backscattered light. After the barcode data is received by the optical reader, the optical reader may decode the barcode data and store it or transmit it to another device for storage.

Another type of data reader is an imaging reader such as a CCD (charge coupled device) or CMOS (complimentary metal oxide semiconductor) in which an entire line of the barcode image or a two-dimensional image of a scan region is focused onto a detector array. The imaging reader typically includes a light source to illuminate the barcode to provide the required signal response. Once the signal has been received for the entire read region, it may be processed and decoded.

Yet another type of data reader does not use optical barcodes, but instead reads electronic tags using radio waves, such as a radio-frequency identification (RFID) reader. An RFID system typically employs at least two components, a "transponder" or "tag" which is attached to a physical item to be identified, and a "reader" which sends an electromagnetic signal to the transponder and then detects a response. Typically, the reader emits an RF signal, which is received by the transponder, after the transponder comes within an appropriate range. In response, the transponder then sends its information via a modulated RF signal back to the reader. The reader detects this modulated signal, and can identify the transponder by decoding the modulated signal. After identifying the transponder, the reader can either store the decoded information or transmit the decoded signal to a computer or other device.

Currently, data readers with multiple reading modes are available, where the data readers are capable of capturing and decoding optical barcode labels, RFID tags, and other data types. Because a different set of decoding parameters is generally required to accurately read and process each data type, these multiple mode data readers typically include functions to provide for toggling between the various reading modes prior to reading or scanning an object to ensure an accurate read. Such data readers may be useful in an environment where objects may contain mixed barcode symbology and RFID tags, such as in a retail store or packaging facility.

The present inventor has recognized a need for a data reader capable of quickly and efficiently toggling between a variety of reading modes to reduce processing time and avoid incorrect reading of particular labels and/or tags. In addition, the present inventor has recognized a need for a data reader that affords an operator the ability to quickly select a specific set of decoding parameters to apply for a particular reading or scanning event.

SUMMARY

Methods and apparatuses relating to a portable data reader are disclosed for improved data reader and processing of items bearing encoded data, such as barcode labels and RFID tags.

For example, one embodiment includes a portable data reader with a reading engine for reading encoded data from an object. The reading engine is associated with a set of decoding instructions and with a control gesture keyed to the reading engine. The portable data reader further includes a touch screen display and a processing subsystem communicatively coupled to both the touch screen display and the reading engine. When the control gesture is applied to the touch screen display, the processing subsystem detects the control gesture, and in response, configures the data reader with the corresponding reading engine.

In other embodiments, the portable data reader includes a plurality of reading engines, each assigned a unique control gesture to distinguish the reading engines from one another. In such embodiments, the processing subsystem is configured to detect the applied control gesture corresponding to one of the reading engines and thereafter configure the data reader with the reading engine keyed to the applied control gesture.

In some embodiments, the control gestures may include a tap with a finger or stylus instrument on the touch screen, or may include a scrolling or dragging event applied across the touch screen or to rocker keys. In still other embodiments, the data reader may include an accelerometer or tilt sensor and the control gesture may be related to activation of the accelerometer, such as by rotating, tilting, shaking, or otherwise moving the data reader.

Additional aspects and advantages will be apparent from the following detailed description of preferred embodiments, which proceeds with reference to the accompanying drawings. The drawings depict only certain preferred embodiments and are not to be considered as limiting in nature.

DETAILED DESCRIPTION OF PREFERRED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Certain embodiments may be capable of achieving various advantages, including one or more of the following: (1) providing a data reader with touch screen, motion-sensing, and/or toggling capabilities for quickly and easily activating various reader modes based on the barcode symbology or presence of RFID tags in an object; and (2) providing a programmable data reader capable of detecting and responding to a variety of programmed control gestures for toggling between various reading modes and configuration settings.

In the following description of the figures and any example embodiments, the system may be referred to in conjunction with use at a retail establishment. It should be understood that such use is merely one example use for such a system. Other uses for a system with the characteristics and features described herein may be implemented, for example, in an industrial location such as a parcel distribution (e.g., postal) station or for processing inventory, as well as other suitable uses.

Figure 1:
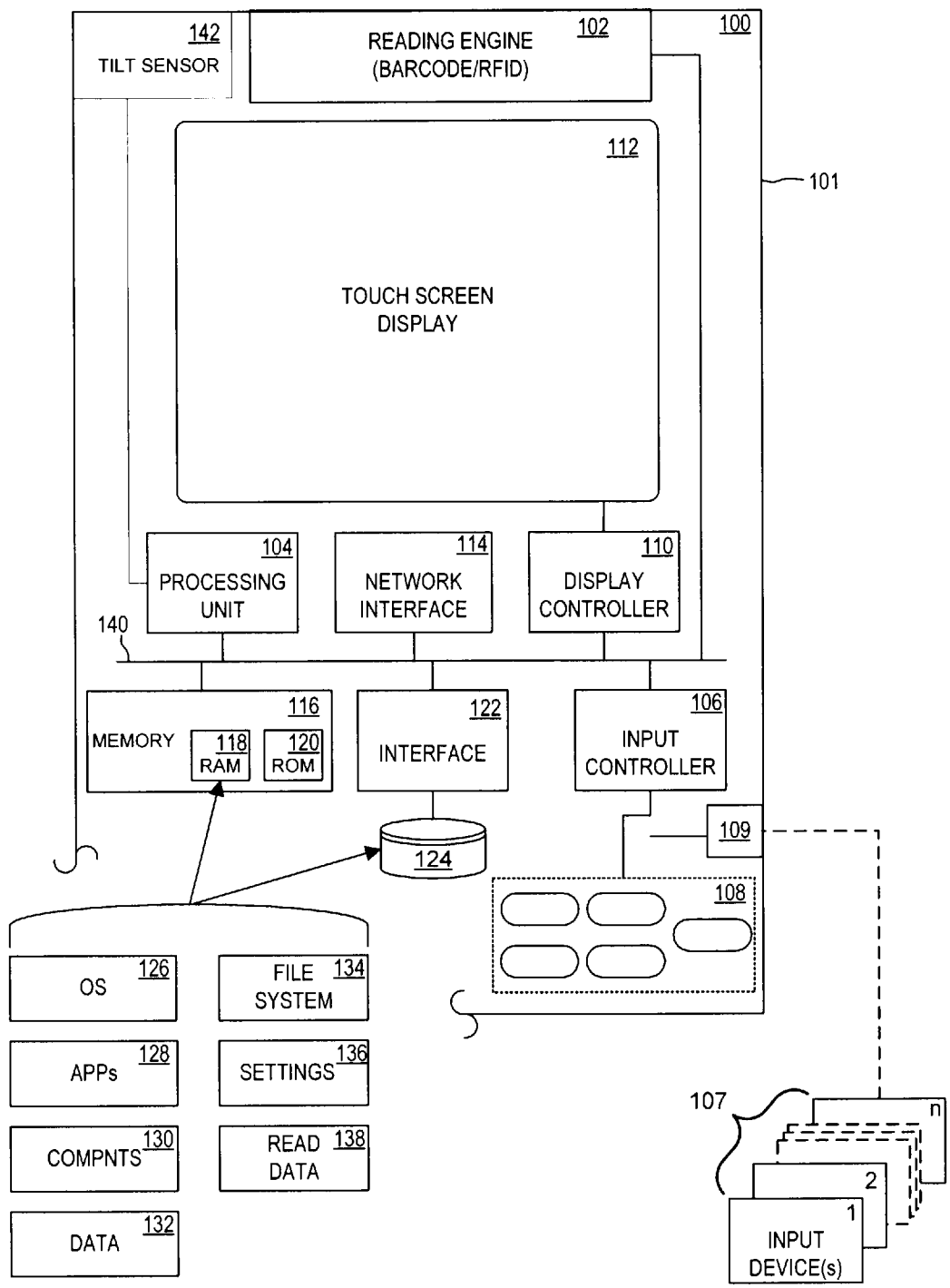
FIG. 1 is a block diagram of a portable data reader having a touch screen display.
Figure 2:
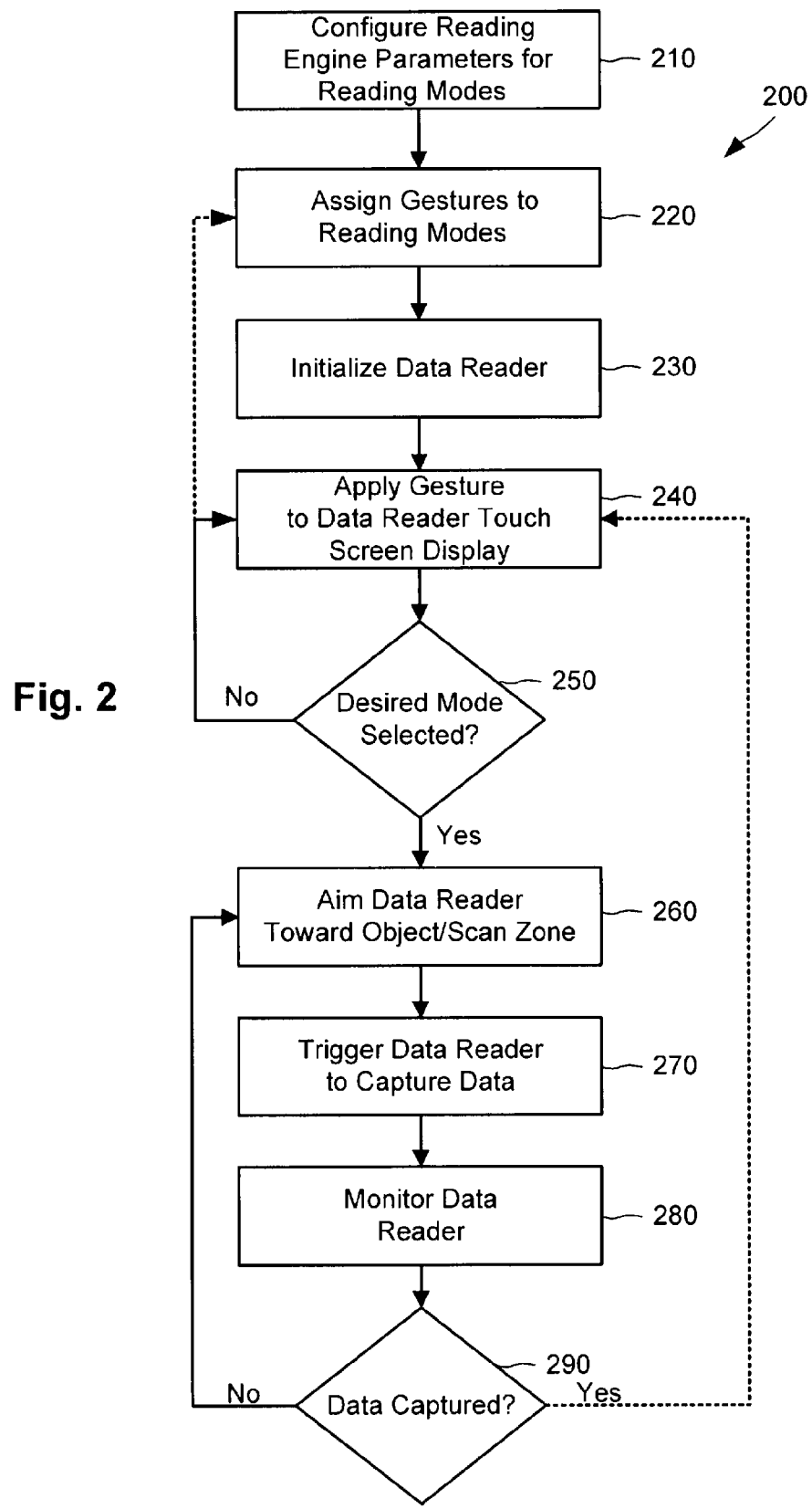
FIG. 2 is a flow chart illustrating a method for operating the portable data reader of FIG. 1.
Figure 3:
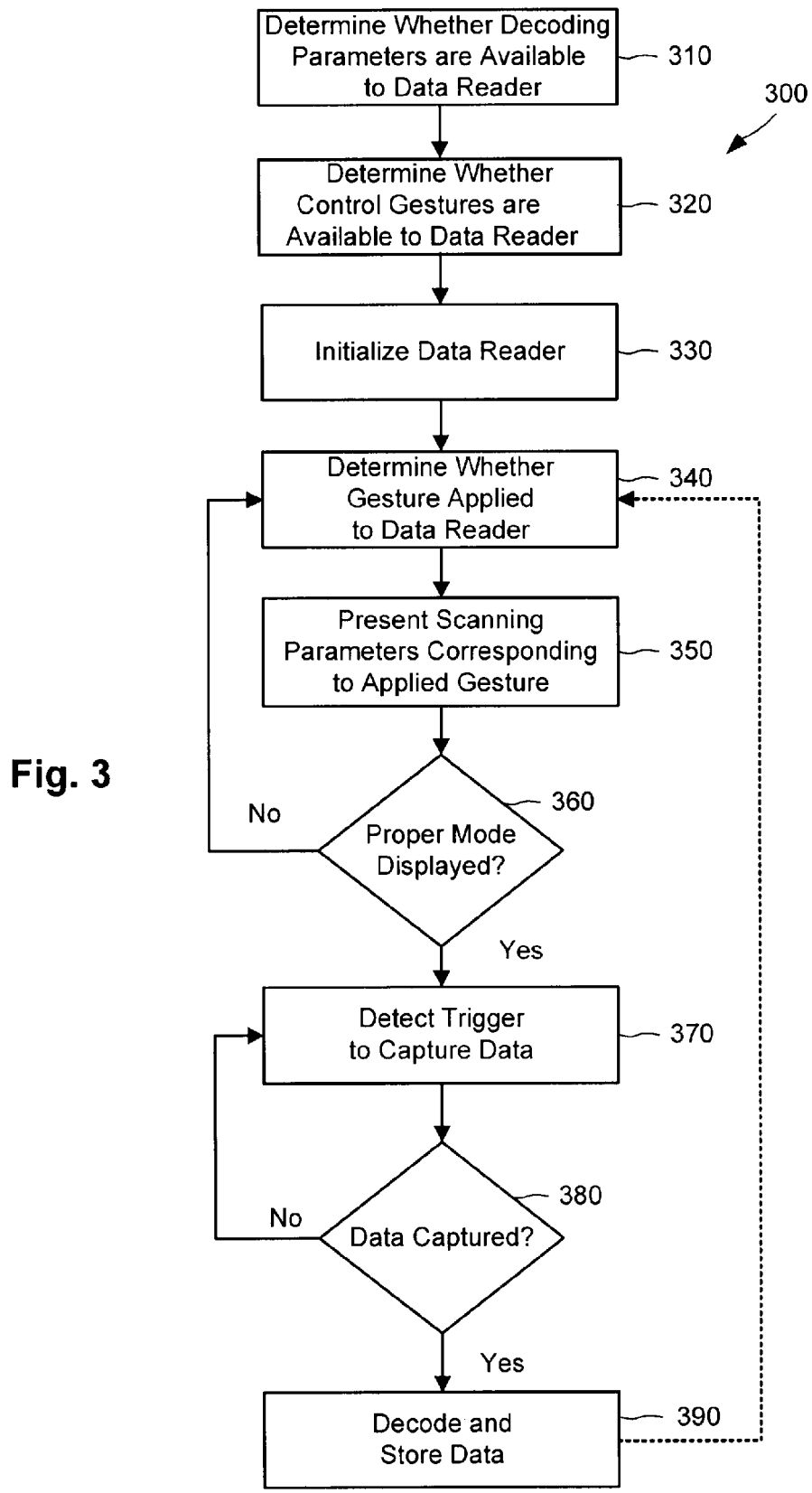
FIG. 3 is a flow chart illustrating a method for reading data with the portable data reader of FIG. 1.

With reference to FIGS. 1-3, a portable data reader 100 may be used to read and process an optical label or RFID tag on an item during a checkout process, such as at a retail store or supermarket. In an example operation, an operator activates the data reader 100 by ensuring that the data reader 100 is powered on and then by pointing the data reader 100 at an object or scan area. Once activated, the operator applies a control gesture (e.g., a swipe, tap, scroll, shake, tilt) to the data reader 100 to set a reader mode for a particular label or tag type, such as a one-dimensional barcode, two-dimensional barcode, or RFID tag. Once the control gesture has been received and processed by the data reader 100, the data reader 100 configures a reading engine 102 in accordance with the chosen reader mode to properly capture the target data. Once the item has been processed, the data reader 100 may thereafter be reconfigured to a different reader mode, if necessary, by applying a different control gesture to the data reader 100.

For example, if the item to be processed bears an RFID tag, the operator applies a control gesture to the data reader 100 corresponding to an RFID reader mode. After the data reader 100 detects and processes the control gesture, the data reader 100 configures the reading engine 102 to read and process an RFID tag. Once properly configured, the data reader 100 captures the RFID tag data from the item and the reading engine 102 processes the RFID tag data accordingly. Once the data has been accurately captured, the data reader 100 may be reconfigured for a different reader mode by applying a different control gesture.

FIG. 1 illustrates a block diagram of the data reader 100, such as a barcode scanner, RFID reader, industrial Portable Data Terminal, or a multi-mode data reader (a multi-mode data reader being capable of reading optical codes, RFID tags, and other data types), according to one embodiment. With reference to FIG. 1, the data reader 100 includes a housing 101 suitable for protecting components (as discussed in detail below) of the data reader 100 therein and for supporting additional components, such as a keyboard 108 and a touch screen display 112, on an exterior surface of the housing 101. The housing 101 is preferably compact and suited for portability and hand-held operation of the data reader 100.

The portable data reader 100 includes one or more reading engines 102, such as an optical label (or barcode) scanning engine, an RFID reading engine, or a multi-mode data reader capable of reading both/multiple data types. The reading engine 102 may read barcode symbols from a physical object, information from an RFID tag, or both. In some example embodiments, the reading engine 102 may include a laser barcode scan engine available from Datalogic ADC, Inc. or other manufacturers. In other embodiments, the reading engine 102 may include an RFID reading engine available from Datalogic ADC, Inc., SAT Corporation of Houston, Tex., or other manufacturers. As used herein, reading engines 102 may encompass laser scanners or imaging scanners (such as CMOS or CCD-based imagers).

The portable data reader 100 may include a processing unit 104. The processing unit 104 may be any of various commercially available processors or other logic machine capable of executing instructions, such as an Intel® XScale™ PXA310 624 MHz processor. Dual microprocessors or other multi-processor architectures may also be employed as the processing unit 104.

A standard input controller 106 may be provided to receive user input from a keyboard/keypad 108, a pointing device (not shown), or other wired/wireless input devices. The input controller 106 may comprise a universal interface driver application specific integrated circuit (UIDA) or other suitable circuits. Further details of an example UIDA can be found in U.S. Pat. No. 6,877,663, which is incorporated by reference herein in its entirety. In some embodiments, other input devices 107 may be included, such as a microphone, digital camera, fingerprint scanner, touchpad, trackball, and tablet. While the input devices 107 may be integrated into the portable data reader 100 and coupled to the processing unit 104 via the input controller 106, the input devices 107 may also connect via other interfaces, such as one or more connector(s) 109. The connector 109 may include one or more data interfaces, bus interfaces, wired or wireless network adapters, or modems for transmitting and receiving data. Accordingly, the input controller 106 may include one or more of hardware, software, and firmware to implement one or more protocols, such as stacked protocols along with corresponding layers, such as for example application layers (e.g., HTTP), transport layers (e.g., TCP), network layers (e.g., IP), and link layers (e.g., Ethernet). According to one embodiment, the connector 109 functions as a serial port (e.g., RS232). However, the connector 109 may also support other interfaces, such as a Universal Serial Bus (USB) port, an Ethernet port, a parallel port, an IEEE 1394 serial port, or an IR interface. The input controller 106 may also support various wired, wireless, optical, and other communication standards.

The portable data reader 100 may present data, prompts, and otherwise communicate with a user via one or more touch screen display devices 112, such as an integrated liquid crystal display (LCD), organic light-emitting diode (OLED), cathode ray tube (CRT) display, or other suitable display with touch screen capabilities. A display controller 110 may drive the display device 112. In some embodiments, the portable data reader 100 may further include a tilt sensor or accelerometer 142 in communication with the processing unit 104 and configured to detect whether the portable data reader 100 has been rotated, tilted, or shaken. In some embodiments, the tilt sensor 142 may be in communication with or electronically coupled to the display controller 110 such that when the tilt sensor 142 is activated (e.g., the data reader 100 is tilted), the display controller 110 triggers a message to display on the touch screen display 112 notifying the user that the tilt sensor 142 has been activated.

The portable data reader 100 may also include a network interface 114 to communicate with one or more other devices, such as a server, a host computer, or a point-of-sale terminal via an external network (not shown). For example, data gathered by, or decoded by, the portable data reader 100 may be passed along to a server. The network interface 114 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radio frequency identification (RFID). In addition, a modem module (not shown) or Ethernet module (not shown) may be coupled to the connector 109 to facilitate a WAN networking environment.

The portable data reader 100 further includes a memory 116, which may be implemented using one or more standard memory devices. The memory devices may include, for instance, RAM 118, ROM 120, and EEPROM devices, and may also include magnetic or optical storage devices, such as hard disk drives, CD-ROM drives, and DVD-ROM drives. The portable data reader 100 may also include an interface 122 coupled to an internal hard disk drive 124. Interface 122 may also be coupled to removable memory, such as flash memory, a magnetic floppy disk drive, an optical disk drive, or another drive. Further, the interface 122 (and/or input controller 106) may be configured for external drive implementations, such as over a USB, IEEE 1194, or PCMCIA connection.

In one embodiment, any number of program modules may be stored in one or more drives 124 and RAM 118, including an operating system 126, one or more application programs 128, other program modules 130 (such as instructions to implement the methods described herein), data 132, file system 134, settings 136, and read data 138. All or portions of the program modules may also be cached in RAM 118. Any suitable operating system 126 may be employed, such as Windows Embedded CE 6.0, Windows Embedded Handheld, Android, Linux, or other commercially available or proprietary operating systems.

The memory 116, the internal hard disk drive 124, or both, may also store a number of settings 136 for the portable data reader 100, which may include various symbology settings, device settings (e.g., user-interface), and network settings. Additionally, the memory 116, the internal hard disk drive 124, or both, may store read data 138 (e.g., symbols and information read from barcodes and RFID tags) obtained by the reading engine 102. Any of the foregoing may be stored within, or indexed by, a file system 134, which may be managed by the operating system 126.

The above-described components, including the reading engine 102, processing unit 104, input controller 106, display controller 110, network interface 114, memory 116, and interface 122, may be interconnected via a bus 140. While a bus-based architecture is illustrated in FIG. 1, other types of architectures are also suitable (e.g., one or more components may be directly coupled to one another). While the illustrated embodiment depicts one possible configuration of a portable data reader 100, it should be recognized that a wide variety of hardware and software configurations may be provided. For example, other versions of the portable data reader 100 may have less than all of these components or may contain other components. Other examples and additional details regarding portable data readers may be found in commonly owned U.S. Pat. No. 7,273,179, issued Sep. 25, 2007, entitled "Portable Data Reading Device With Integrated Web Server For Configuration And Data Extraction," which is incorporated herein by reference in its entirety.

FIG. 2 is a flow chart illustrating a method 200 for operating a portable data reader 100 according to one embodiment. With reference to FIG. 2, at step 210, the reading engine 102 may be configured with decoding parameters and filters as desired. The various decoding parameters and filters chosen may depend on the specific reading engine 102 being configured and used, such as an optical barcode scanning engine or an RFID reading engine. In some embodiments, the decoding parameters and filters may include one or more of the following: instructions for length of time to spend on decoding 1D and 2D labels and or RFID tags, instructions for reading data of a specific length, instructions for minimum and maximum acceptable length for 1D and 2D labels and RFID tags, parameters relating to label/tag prefix and postfix, decoding aggressiveness, RFID classes and other traditional symbology and/or RFID tag characteristics. These instructions may vary for each of the different reading engines 102 based on, for instance, the inherent limitations and characteristics of each data type.

The reading engine 102 may be programmed and/or otherwise configured via an input or control panel on the data reader 100, such as using the keyboard/keypad 108 or other input devices 107. In other embodiments, the reading engine 102 may be configured remotely via connector 109, such as through a USB device, network interface 114, or using the interface 122, such as through a hard disk or CD, or any other suitable device. Once entered or uploaded, the decoding parameters may be stored in memory 116 or the internal hard disk drive 124.

In step 220, once the various decoding parameters for the reading engines 102 have been entered and stored on the data reader 100, each of the reading engines 102 (e.g., 1D, 2D, RFID engines, or other decoding engines) and their associated decoding parameters, or a specific subset of decoding parameters, are assigned a unique control gesture. The control gestures allow an operator of the portable data reader 100 to call up a specific reading engine 102 and a desired set of decoding parameters simply by applying a particular control gesture to the portable data reader 100 (as will be explained in further detail in step 240 below). The control gestures may be assigned to the reading engines 102 and decoding parameters using any suitable programming techniques. Instructions for assigning the control gestures may be programmed to the portable data reader 100 using an input device, such as the keyboard 108, or may otherwise be loaded using a connector 109, such as through a USB device, Network Interface 114, or using the interface 122, such as through a hard disk or CD-Rom drive, or any other suitable device.

The following description includes example control gestures that may be assigned in step 220. It should be understood that the control gestures described herein are for illustrative purposes only and that different control gestures than those described herein may be assigned to the various settings or that numerous other control gestures not specifically described herein may also be assigned in step 220 without departing from the principles of the disclosure.

In one embodiment, a unique control gesture may be assigned to trigger each of the reading engines 102 (or to trigger one reader mode in a reading engine 102 with multiple reader modes, such as a dual optical code/RFID reader) depending on the type of encoded data that is to be processed. For example, in one configuration, the portable data reader 100 may include four different reading engines 102, including 1D, 2D, imager, and RFID reading engines (or a single reading engine 102 with each of these four reader modes). In such a configuration, a unique control gesture may be assigned to each of these reading engines 102.

In some embodiments, the control gestures may be assigned as illustrated in Table A below. In the following description, a flick control gesture is defined as including scrolling events and directional rapid touch events performed on the touch screen display 112, and a pan control gesture is defined as including a press, hold, and drag gesture event performed on the touch screen display 112. With reference to Table A, in one embodiment, a flick or pan control gesture from a central portion of the touch screen display 112 to the left may be associated with a 1D reading engine; a flick or pan from the central portion to the right may be associated with a 2D reading engine; a flick or pan from the central portion in an upward direction may be associated with an imager reading engine; and a flick or pan from the central portion in a downward direction may be associated with an RFID reading engine. Other embodiments may include additional control gestures to accommodate additional reading engine types as necessary.

TABLE A

Control Gestures According to One Embodiment

| Data Reader Mode | Control Gesture |
| --- | --- |
| 1D Optical Reader | Flick gesture to the left |
| 2D Optical Reader | Flick gesture to the right |
| RFID Reader | Flick gesture downward |
| Imaging Reader | Flick gesture upward |

In another embodiment, each decoding parameter, or a group or subset of decoding parameters, for a particular reading engine 102 is also assigned a unique control gesture to allow for a more customized operator experience. For example, each of the 1D and 2D reading engines may include additional specific control gestures for decoding parameters relating to a particular length of code, symbology, prefix, postfix, and other typical scanning or reading characteristics. For instance, in one example configuration, after selection of a 1D reading engine, the operator may then apply a second control gesture to the touch screen 112 to select a particular set of decoding parameters to run with the reading engine 102. In such configurations, the touch screen 112 may display a first screen prompting the operator to apply a control gesture to select a desired reading engine 102. Once that selection has been made, the touch screen 112 may thereafter display a second screen prompting the operator to apply a second control gesture to select a set of decoding parameters to run with the reading engine 102.

In other configurations, each unique control gesture may be assigned to a particular reading engine 102 that already contains a specific package of decoding parameters associated therewith. For instance, in one configuration, a flick to the left may be associated with a 1D barcode engine which will only read Code 3 of 9 symbology labels of a specific or any length; and a flick to the right may be associated with a 1D barcode engine which will only read Code 128 symbology labels of a specific or any length; and flicks in the upward and downward directions may be associated with a 1D barcode engine which will only read other code symbologies of a specific length. In other embodiments, the RFID reading engine can be configured in a similar fashion as the 1D engine, for example: a flick in the upward direction may be associated with the RFID reader reading RFID tags with a certain prefix and specific length and class, and a flick in the downward direction may associated with reading an RFID tag with a different prefix and different length and class.

As mentioned previously, depending on the number of decoding parameters and filters that may be assigned to each reading engine 102, and the individual preferences of the operator, the control gestures may be the same or different than those described above.

In some embodiments, physical movement of the portable data reader 100 may also be assigned (and interpreted by the data reader 100) as a control gesture. In such embodiments, the data reader 100 may include a tilt sensor or accelerometer 142 coupled to the housing 101 of the data reader 100 and configured to detect physical movement of the data reader 100, which may include tilting, rotating, or shaking of the portable data reader 100. For instance, tilting the portable data reader 100 in a downward direction may be assigned and associated with reading RFID tags of a certain class, prefix and length, while tilting the portable data reader 100 in an upward direction may be associated with reading RFID tags with a different prefix and length. Similar movement or tilt control gestures may be assigned to 1D and 2D reading engines 102.

In some embodiments, to avoid the tilt sensor 142 from interfering with a selection already entered by the operator, the tilt sensor 142 and/or the processing unit 104 may be programmed to ignore readings from the tilt sensor 142 once a selection has been entered on the data reader 100. Additionally, there may be debouncing timeout settings and/or configuration settings on the data reader 100 for tilt thresholds along the x, y, and/or z axes to avoid detection of inadvertent or unintended tilting motions.

In yet other embodiments, control gestures on the keyboard 108, which may include rocker keys and other activation keys, may also be interpreted and assigned as a control gesture in a similar fashion as previously described. For instance, one or more rocker keys may be assigned to trigger the 1D, 2D, imager, and RFID reading engine 102.

In still other embodiments, a combination of touch screen, motion, and keyboard control gestures may be assigned to particular reading modes such that the portable data reader 100 may interpret a combination of control gestures applied to the touch screen display 112, motion control gestures detected by the tilt sensor 142, and input control gestures by the keyboard 108 to allow for more operator customization. For instance, in one embodiment, the data reader 100 may be configured to allow for a selection between a 1D or 2D imager by applying an appropriate control gesture to the touch screen display 112 as previously described. In addition, the tilt sensor 142 may be associated with the RFID reader, such that tilting of the data reader 100 in an upward direction configures the data reader 100 to read an RFID tag having a specific length, while tilting the data reader 100 in a downward direction configures the data reader 100 to read an RFID tag having a different length. Finally, a rocker key on the keypad 108 may be associated with the camera-based imaging reader such that activation of the rocker key configures the data reader 100 for camera-based imaging. In such configurations, the operator may apply a gesture on the touch screen display 112, tilt the data reader 100 to activate the tilt sensor 142, or press the rocker key on the keypad 108 to select a reader mode for the data reader 100. In other embodiments, the various features and components of the data reader 100 (e.g., the keyboard 108, the tilt sensor 142, and the touch screen display 112) may be assigned to different reader modes as desired.

In some embodiments, the control gestures are intuitively assigned so as to simplify the toggling process between the various settings for the reading engine 102 and decoding parameters. For instance, in one embodiment (see Table B), the assigned control gesture for selecting a 1D reading engine 102 may include a simple vertical swipe on the touch screen display 112 with one finger so as to create a control gesture resembling a roman numeral one. In addition, the control gesture for selecting a 2D reading engine 102 may include a vertical swipe on the touch screen display 112 using two fingers simultaneously in a substantially parallel orientation so as to create a control gesture resembling a roman numeral two (i.e., a multi-touch gesture).

In other embodiments, the control gestures may include other single or multi-touch gestures than those specifically described herein. In still other embodiments, one or both of these control gestures can be made as described but applied along a horizontal axis across the touch screen display 112. In addition, the assigned control gesture for selecting an RFID reader may include a single finger motion on the touch screen display in the shape of the letter "R." Similarly, the assigned control gesture for selecting a camera-based reader, such as an imager, may be a single finger motion resembling the shape of the letter "C" (for camera). Regarding choice of the letters "R" and "C" for an RFID reader and imager, respectively, it should be understood that in a different language, the names of these particular reader modes may begin with a different letter or character symbol, such that the intuitive control gesture may instead be that particular letter or character.

TABLE B

Control Gestures According to One Embodiment

| Data Reader Mode | Control Gesture |
|---|---|
| 1D Optical Reader | Single swipe |
| 2D Optical Reader | Multi-touch Swipe |
| RFID Reader | Letter "R" motion |
| Imaging Reader | Letter "C" motion |

Next, in step 230, the operator initializes or activates the portable data reader 100, such as by ensuring the portable data reader 100 is properly powered on and then pointing it at an item bearing a barcode label or RFID tag, or by pointing it at a specific scan zone. In some instances, the portable data reader 100 may undergo a hard reboot by cycling its power (e.g., turning the portable data reader off and then back on) or a soft reboot (e.g., via restarting the portable data reader).

At step 240, the operator applies a control gesture to the portable data reader 100 to select a reading engine 102 and a particular decoding parameter or subset of decoding parameters for the reading engine 102 to process. As mentioned previously in step 220, the portable data reader 100 is programmable to assign a unique control gesture to the reading engine 102 (capable of reading and decoding 1D barcodes, 2D barcodes, RFID tags, and other similar encoded data) and to each associated decoding parameter or filter such that the operator can apply the control gesture to select a particular reading engine 102 and a particular set or subset of decoding parameters.

The following briefly describes an example operation for applying a control gesture to configure the data reader 100. During a scanning operation, the operator will first typically determine the particular data type carried by the item or object to be scanned. Once the operator confirms the particular data type carried by the item (e.g., a 2D barcode label), the operator applies the appropriate control gesture for that data type (e.g., a multi-touch swipe resembling a roman numeral two to select the 2D reading engine) to configure the data reader 100. If the operator is also configuring any particular decoding parameters, the operator may apply a swipe, flick, or other control gesture to select the desired decoding parameters. The operator may then proceed to read the data from the item.

In some embodiments, to simplify use of the data reader 100, the touch screen display 112 may include a legend or other feature visible to the operator with information regarding the assigned control gestures for some or all of the reading engine 102 and decoding parameter configurations. In some embodiments, prior to applying a control gesture, the user may consult the legend or review control gesture options displayed on the touch screen display 112 to ensure that the desired option is being applied. In other embodiments, the operator may apply a combination of motion, touch screen, and keyboard control gestures to select the desired reading engine 102 and decoding parameters.

In still other embodiments, the touch screen display 112 may provide a residual indication of the control gesture (e.g., motion and/or letter) applied to the touch screen 112 to provide the operator with feedback that the data reader 100 has properly recognized a desired selection.

Next, at step 250, the operator ensures that desired settings (i.e., reading engine 102 and decoding parameters) have been selected. The touch screen 112 may present a prompt to the operator allowing the operator to confirm or deny that the selection was properly made. In some instances, the operator may have erroneously applied a control gesture for a different reading engine 102 or a different set of decoding parameters than intended. In other instances, the portable data reader 100 may have misinterpreted the applied control gesture and called up the incorrect reading engine 102 or decoding parameters. In any case, if the desired mode is not selected and the operator does not wish to continue with the selected settings, the operator may communicate to the data reader 100 that the desired mode was not selected and thereafter return to step 240 and re-apply the control gesture to select new settings.

In some embodiments, the operator may return to step 220 and reconfigure some or all of the assigned control gestures, if desired. The control gestures may be reconfigured using the keyboard 108 or other input device on the portable data reader 100 using the same or similar programming techniques and skills that were used to originally assign the control gestures.

In other embodiments, the touch screen display 112 may be programmed to include a selectable reassignment option for quickly reassigning control gestures as desired, allowing for personal customization by the user or organization. In such embodiments, the operator may simply select the reassignment option, select the reading engines 102 or decoding parameters that are to be reassigned, apply a new control gesture on the touch screen display 112 (or scroll through and select a new control gesture from a menu of available control gestures) to reassign the chosen engine and/or decoding parameters, and thereafter save the reassigned settings. In other embodiments, the keyboard 108 may include a reassignment key that the operator can depress or trigger and then reassign settings using the keyboard 108 as desired. The portable data reader 100 may or may not need to be rebooted to incorporate the reassigned control gestures depending on its configuration.

Next, in step 260, once the proper reading engine 102 and decoding parameters have been selected and properly configured in the portable data reader 100, the operator aims the portable data reader toward the object or scan zone to capture the data. In some embodiments, the data reader 100 may include or project a visual aid, such as a green spot or other visible pattern, to assist the operator in properly aiming the data reader 100 at the object or scan zone.

In step 270, after ensuring that the portable data reader 100 has an unobstructed view or is within proper range of the target data, the operator triggers the portable data reader 100 to capture the data. In some embodiments, triggering may be activated automatically as a result of the applied control gesture.

In step 280, the operator monitors the portable data reader 100 to ensure that the proper data has been captured. Step 280 may be accomplished in several ways. For instance, in one embodiment, the portable data reader 100 may include an audible signal to denote that data has or has not been captured. For example, the data reader 100 may emit a first tone (e.g., a "beep" tone) to denote that data has been captured and a second tone (e.g., a "bonk" tone) to denote that data has failed to be captured. In another embodiment, the portable data reader 100 may include (separately or in addition to the audible signal(s)): (1) a light indicator that changes color (e.g., green for a good read and red for a bad read) to indicate whether the data has been read successfully; and/or (2) a message or an image on the touch screen display 112 to indicate whether the read was good or bad. In other embodiments, other suitable notification techniques may be used.

In step 290, the operator, using an indicator mode similar to those described above or by another suitable method, then determines whether the data was properly captured. If the data was properly captured, then the operator may set that item aside and continue processing any remaining items. If the data was not properly captured, then the operator may revert back to step 260 for a subsequent attempt at capturing the data. In some instances, the operator may opt to revert back to step 240, such as if the operator determines that the problem occurred as a result of selecting the improper reading engine 102 or decoding parameters.

In some embodiments, the data reader 100 may be programmed to continue with the selected reading engine 102 and decoding parameters until the operator takes affirmative steps to change the settings. If at any point the operator desires to change the reading engine 102 or the decoding parameters, the operator may return to step 240 to apply a different control gesture to reconfigure the portable data reader 100 to the desired settings. In such instances, the portable data reader 100 may include a reconfiguration option on the touch screen display 112 or a reconfiguration button on the keyboard 108 to allow the operator to initiate the reconfiguration process when desired. During the reconfiguration process, the operator may change the reading engine 102 or the decoding parameters by applying a different control gesture associated with the desired reading engine 102.

In some embodiments, to avoid unintended or improper detection of a reconfiguration command, the data reader 100 may require a confirmation response from the operator to verify that a reconfiguration of the data reader 100 is desired. In other embodiments, the data reader 100 may include a separate locking feature so that inadvertent swipes or contact with the touch screen display 112 during the scanning or reading process do not change the reading engine 102. Similarly, in the embodiments using the tilt sensor 142, the portable data reader 100 may include a similar locking function to avoid switching reading engines 102 when the portable data reader 100 is moved during the reading process.

It should be understood that while the steps in the method 200 are presented and described in a particular order, the order is for convenience only and is not meant to be limiting. In some embodiments, the steps may be performed in an order different than what is specified herein. In addition, the method 200 may include additional steps and features other than those included herein. In some embodiments, the method 200 may combine certain steps. For example, steps 210 and 220 may be combined into one configuration step where the reading engine 102 is configured with the various decoding parameters and filters, and as part of that configuration step, the decoding parameters and filters include instructions for assigning a corresponding control gesture. As another example, steps 230, 240 and 270 may be combined into one step wherein applying the control gesture on the touch screen display 240 also automatically activates and triggers the portable data reader 100. In other embodiments, the method 200 may omit certain steps, such as prompt step 250.

FIG. 3 is a flow chart illustrating a method 300 for data reading by the portable data reader 100 according to one embodiment. With reference to FIG. 3, at step 310, the portable data reader 100 determines whether decoding parameters for the reading engine(s) 102 are available to the data reader 100. To determine whether decoding parameters are available, the processing unit 104 may search memory 116, interface 122, and/or connector 109 to determine whether any decoding parameters are stored therein. The decoding parameters may be similar to those described in relation to method 200 and may include, for example, instructions for maximum and minimum lengths of 1D codes, 2D codes, and RFID tags, instructions for reading data of a specific length, and other traditional symbology and RFID tag characteristics.

In some embodiments, the processing unit 104 (or other component of the data reader 100) may also search a separate device, such as a memory card or disk drive connected to the data reader 100. Further, the processing unit 104 may also communicate (e.g., via a wired or wireless connection) with a remote device or computer to determine whether decoding parameters are stored remotely from the data reader 100 and are accessible to the data reader 100, such as for running the decoding parameters remotely or for downloading the decoding parameters to the data reader 100.

Once the data reader 100 has determined that decoding parameters for the reading engine(s) 102 are available and accessible to the data reader 100, at step 320, the portable data reader 100 determines whether corresponding control gestures are associated with the reading engine(s) 102 and associated decoding parameters. The portable data reader 100 may run a similar search protocol as described above with respect to step 310 to determine whether control gestures are stored therein or stored on a remote system accessible to the data reader 100.

At step 330, after confirmation that decoding parameters for the reading engine(s) 102 and associated control gestures are accessible to the data reader 100, the data reader 100 activates in response to an operator's action of powering on, rebooting, or resetting the portable data reader 100. In some embodiments, the data reader 100 may activate in response to tapping the touch screen display 112.

Once activated, at step 340, the portable data reader 100 detects or determines whether a control gesture has been applied. Step 340 may be accomplished in several ways. In some embodiments, the display controller 110 and/or the processing unit 104 may be configured to determine whether a stylus instrument, a finger, or other pointing device has contacted the touch screen display 112. The display controller 110 and/or processing unit 104 may be programmed to ignore intermittent or incidental contact (e.g., constant contact is not maintained for a minimum time threshold) with the touch screen display 112.

In other embodiments, the processing unit 104 may be in communication with a tilt sensor 142 to detect whether the portable data reader 100 has been tilted or moved in any direction or shaken, and to determine whether any of these control gestures have been assigned to a reading engine 102 and/or a set of decoding parameters. If movement has not been assigned as a control gesture, the data reader 100 may ignore movement and tilting control gestures. In yet another embodiment, the processing unit 104 is in communication with the keyboard 108 to determine whether control gesture inputs have been entered on the keyboard 108.

In any event, once the portable data reader 100 detects or determines that a control gesture has been applied, the display controller 110 and/or processing unit 104 may communicate with the memory 116, interface 122, connector 109, or other system (e.g., a remote computer) to determine whether the detected control gesture corresponds with a stored control gesture for a reading engine 102 and/or specific decoding parameters. The control gestures referenced in relation to step 340 may be the same as or similar to those described with respect to method 200.

In some embodiments, the touch screen display 112 may be programmed to present a menu of options including the various reading engines 102 for which the data reader 100 is capable of running and the various decoding parameters that are available. The display 112 may also present a legend or other feature visible to the operator with information regarding the assigned control gestures for all or some of the reading engine(s) 102 and decoding parameter configurations.

At step 350, after the operator has applied a control gesture, the display 112 may be configured to present the selected reading engine 102 and associated decoding parameters for the operator's review. The display 112 may further include a prompt to the operator to allow the operator to confirm or deny that the displayed settings are correct.

At step 360, if the operator indicates that the proper reading engine 102 and/or the associated decoding parameters are not as desired, the method 300 may revert back to step 340 where the portable data reader 100 detects the applied control gesture. In such cases, the operator may reapply the control gesture or apply a new control gesture to correct the selection. In some embodiments, the operator may reprogram and/or reconfigure the data reader 100 to change the stored assigned control gestures or assign new control gestures to the reading engines 102 and decoding parameters.

Once the operator indicates that the proper selection has been made, at step 370, the portable data reader 100 determines whether a trigger has been activated to initiate a data capture event. In some embodiments, the trigger may be a mechanism (e.g., a lever or button) on the data reader 100 that may be manually depressed or otherwise actuated, or it may be a prompt on the display 112 that may be activated by touch, or any other suitable mechanism for initiating the data reader 100 to capture data of an object.

At step 380, the portable data reader 100 indicates whether a read was successful. In some embodiments, the portable data reader 100 may emit a beeping sound or other good/bad read tone, or may trigger a light indicator, or display a message on the display 112 alerting the operator of the read status. If the read was bad, the method 300 may revert back to step 370 or any of the previous steps to reattempt the read.

If the read was successful, at step 390, the portable data reader 100 will decode the captured data based on the selected reading engine 102 and decoding parameters. Thereafter, the portable data reader 100 may store the decoded data in any suitable medium, such as in memory 116, in internal hard disk drive 124, on an external input device 107, or may instead send the decoded data to another computer or device in communication with the portable data reader 100. After a successful read and decoding, the method 300 may revert back to step 340 to process subsequent items. In some instances, the data reader 100 may simply default to the last chosen reading engine 102 and decoding parameters until a different control gesture is applied to reconfigure the data reader 100.

It should be understood that while the steps in the method 300 are presented and described in a particular order, the order is for convenience only and is not meant to be limiting. In some embodiments, the steps may be performed in an order different than what is specified herein. In addition, the method 300 may include additional steps and features other than those included herein. In some embodiments, the method 300 may combine certain steps. For example, steps 310 and 320 may be combined into one step where the portable data reader 100 determines substantially simultaneously whether decoding parameters and associated control gestures are stored therein. In some embodiments, steps in the method 300 may be skipped altogether. For example, the portable data reader 100 may not display the selected reading modes or seek the operator's input in steps 340 and 350 and instead await instructions triggering the data reader 100 to capture data in step 370 after it determines that a control gesture was applied in step 330.

The terms and descriptions used above are set forth by way of illustration only and are not meant as limitations. Those skilled in the art will recognize that many variations can be made to the details of the above-described embodiments without departing from the underlying principles of the invention. The scope of the present invention should, therefore, be determined only by the following claims.

The invention claimed is:

1. A data reader for reading data from an object, the data reader comprising:

a housing adapted for handheld operation;

a reading engine associated with a first set of decoding instructions and with a different second set of decoding instructions, wherein the reading engine and the first set of decoding instructions are further associated with a first unique control gesture, and wherein the reading engine and the second set of decoding instructions are further associated with a second unique control gesture different from the first unique control gesture;

a touch screen supported on the housing, wherein the touch screen includes a touch screen surface, and wherein the first reading engine and the first set of decoding instructions are selectable by applying the first unique control gesture to the touch screen surface, and wherein the first reading engine and the second set of decoding instructions are selectable by applying the second unique control gesture to the touch screen surface;

an input device separate from the touch screen, the input device operable for programming both the first and second sets of decoding instructions for the reading engine, and for associating the first unique control gesture with the first set of decoding instructions and the second unique control gesture with the second set of decoding instructions; and a processing subsystem communicatively coupled with the reading engine and the touch screen, wherein, in response to detecting that the first unique control gesture has been applied to the touch screen surface, the processing subsystem configures the data reader with the reading engine and the first set of decoding instructions, and wherein in response to detecting that the second unique control gesture has been applied to the touch screen surface, the processing subsystem configures the data reader with the reading engine and the second set of decoding instructions.

2. The data reader of claim 1, further comprising:

a second reading engine different from the first reading engine, the second reading engine associated with a third set of decoding instructions and with a fourth set of decoding instructions, wherein the second reading engine and the third set of decoding instructions are further associated with a third unique control gesture, and wherein the second reading engine and the fourth set of decoding instructions are further associated with a fourth unique control gesture to uniquely distinguish the first and second reading engines from one another, and wherein the processing subsystem is further configured to:

detect that one of the first, second, third, or fourth unique control gestures has been applied to the touch screen surface;

determine a selected reading engine from the first and second reading engines and a corresponding selected set of decoding instructions, based on the detected one of the first, second, third, or fourth unique control gestures; and configure the data reader with the selected reading engine and the corresponding selected set of decoding instructions.

3. The data reader of claim 1, wherein one or both of the first and second unique control gestures includes a scrolling motion across the touch screen surface.

4. The data reader of claim 1, wherein the processing subsystem is further configured to initiate the reading engine to trigger a reading event upon determining that the first or second unique control gesture has been applied to the touch screen.

5. The data reader of claim 2, wherein the first reading engine includes a 1D barcode reading engine and the second reading engine includes a 2D barcode reading engine, wherein the first and second unique control gestures are associated with a single swipe control gesture and the third and fourth unique control gestures are associated with a multi-touch swipe control gesture, and wherein the 1D barcode reading engine is selectable by applying the single swipe control gesture to the touch screen surface and the 2D barcode reading engine is selectable by applying the multi-touch swipe control gesture to the touch screen surface.

6. The data reader of claim 2, wherein the touch screen is configured to display a menu presenting the first and second reading engines and the first, second, third, and fourth set of decoding instructions that are selectable via the touch screen surface.

7. The data reader of claim 2, further comprising an accelerometer coupled to the housing and in communication with the processing subsystem, wherein the accelerometer is configured to detect physical movement of the data reader, and wherein the processing subsystem is further configured to determine whether the accelerometer has detected physical movement of the data reader.

8. The data reader of claim 7, wherein one or both of the first and second reading engines is associated with the accelerometer and is selectable via activation of the accelerometer, and wherein the processing subsystem is further configured to determine whether one of the first or second reading engines has been selected via activation of the accelerometer.

9. The data reader of claim 8, wherein one of the first, second, third, or fourth unique control gestures includes tilting the data reader.

10. The data reader of claim 1, further comprising a second reading engine different from the first reading engine, the second reading engine associated with a third set of decoding instructions, and wherein the processing subsystem is further communicatively coupled with the second reading engine and the input device, wherein, in response to detecting activation of the input device, the processing subsystem configures the data reader with the second reading engine and the third set of decoding instructions.

11. A data reader for reading data from an object, the data reader comprising:

a housing;

a touch screen supported on the housing, the touch screen having a touch screen surface and configured to display a menu of data reading operations to the operator, wherein the menu of data reading operations includes: (a) a first data reading mode having a first set of decoding parameters for decoding an optical code, the first set of decoding parameters including a first plurality of packages of decoding parameters; and (b) a second data reading mode having a second set of decoding parameters associated with decoding an RFID tag, the second set of decoding parameters including a second plurality of packages of decoding parameters, wherein the first data reading mode is selectable by applying a first unique control gesture to the touch screen surface, and wherein a first package of decoding parameters is selectable from the first set of decoding parameters by applying a second control gesture to the touch screen surface following selection of the first data reading mode, and wherein the second data reading mode is selectable by applying a third unique control gesture different from the first unique control gesture to the touch screen surface, and wherein a second package of decoding parameters is selectable from the second set of decoding parameters by applying a fourth control gesture to the touch screen surface following selection of the second data reading mode; and a processing subsystem coupled to the touch screen and the one or more reading engines, the processing subsystem configured to:
- detect that one of the first or third unique control gestures has been applied to the touch screen surface;
- determine whether one of the first or second data reading modes has been selected from the menu of data reading operations on the touch screen based on the detection of the first or third unique control gesture, thereby resulting in a selected data reading mode;
- detect that one of the second or fourth control gestures has been applied to the touch screen surface;
- determine whether one of the first or second packages of decoding parameters has been selected from the menu of data reading operations on the touch screen based on the detection of the second or fourth control gesture, thereby resulting in a selected package of decoding parameters; and
- configure the data reader with the selected data reading mode and the selected package of decoding parameters.

12. The data reader of claim 11, wherein the touch screen surface includes a first region associated with the first data reading mode and a second region associated with the second data reading mode, and wherein the first data reading mode is selectable by applying the first unique control gesture such that contact is made along the first region of the touch screen surface and the second data reading mode is selectable by applying the third unique control gesture such that contact is made along the second region of the touch screen surface.

13. The data reader of claim 12, wherein the processing subsystem configured to determine whether one of the data reading modes has been selected from the menu of data reading operations further includes the processing subsystem configured to determine whether the first unique control gesture has been applied along the first region or whether the third unique control gesture has been applied along the second region.

14. The data reader of claim 11, further comprising an accelerometer coupled to the housing and in communication with the processing subsystem, wherein the accelerometer is configured to detect physical movement of the data reader, and wherein the processing subsystem is further configured to determine whether the accelerometer has detected physical movement of the data reader.

15. The data reader of claim 14, wherein a third data reading mode having a third set of decoding parameters is associated with the accelerometer and selectable via activation of the accelerometer, and wherein the processing subsystem is further configured to determine whether the accelerometer has been activated and, in response, configure the data reader with the third data reading mode.

16. The data reader of claim 11, wherein the first data reading mode includes a 1D barcode reading mode and a 2D barcode reading mode, wherein the first unique control gesture is associated with a single swipe touch screen control gesture in the form of a roman numeral one and the third unique control gesture is associated with a simultaneous dual swipe touch screen control gesture in the form of a roman numeral two, and wherein the 1D barcode reading mode is selectable by applying the single swipe control gesture to the touch screen surface and the 2D barcode reading mode is selectable by applying the dual swipe control gesture to the touch screen surface.

17. A method for data reading with a data reader having a reading engine for reading data from an object, the method comprising the steps of:
- associating, by the data reader, a first unique control gesture with a reading engine;
- associating, by the data reader, a second unique control gesture with a first set of decoding parameters for the reading engine;
- associating, by the data reader, a third unique control gesture with a second set of decoding parameters for the reading engine;
- detecting, by the data reader, application of the first unique control gesture on a touch screen surface of the data reader;
- determining, by the data reader, that the first unique control gesture corresponds to the reading engine;
- determining, by the data reader, application of one of the second or third unique control gestures on the touch screen surface of the data reader;
- determining, by the data reader, a selected package of decoding parameters from the respective first or second set of decoding parameters based on application of the second or third unique control gesture;
- configuring, by the data reader, the reading engine and the selected package of decoding parameters;
- in response to activation of a triggering mechanism on the data reader, capturing, by the data reader, information from a data source; and
- decoding, by the data reader, the information captured from the data source using the reading engine and the selected package of decoding parameters.

18. The method of claim 17, further comprising the step of presenting on the touch screen display of the data reader a menu including information relating to the reading engine, the plurality of packages of decoding parameters in the first set of decoding parameters, and the plurality of packages of decoding parameters in the second set of decoding parameters available for selection and the corresponding first, second and third control gestures associated therewith.

19. The method of claim 17, wherein the data reader further includes an accelerometer and the method further comprises the steps of:
- associating, by the data reader, the accelerometer with a second reading engine; and
- determining, by the data reader, whether the accelerometer has been activated by physical movement of the data reader.

20. The method of claim 17, further comprising the step of indicating, by the data reader, whether the data has been captured.

* * * * *